2,874,179

LOWER ALKYL ESTERS OF 1,4a-DIMETHYL-8-OXO-1,2,3,4,4a,4b,5,6,7,9,10,11,12,12a - TETRADECAHYDROCHRYSENE - 1 - CARBOXYLIC ACID

Willard M. Hoehn, Wilmette, Ill., assignor to G. D. Searle & Co., Chicago, Ill., a corporation of Delaware No Drawing. Application February 10, 1958
Serial No. 714,048

2 Claims. (Cl. 260—468.5)

The present invention relates to a new group of chrysene derivatives and, more particularly to the esters of 1,4a-dimethyl-8-oxo-1,2,3,4,4a,4b,5,6,8,9,10,11,12,12a-tetradecahydrochrysene-1-carboxylic acid. These esters can be represented by the general structural formula

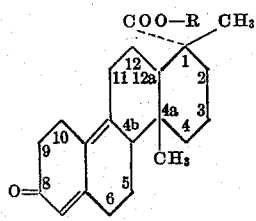

In the foregoing structural formula the radical R can represent a lower alkyl radical such as methyl, ethyl, straight chained or branched propyl, butyl, amyl or hexyl.

These esters are conveniently prepared from the corresponding lower alkyl esters of 1,4a-dimethyl-7-oxo-1,2,3,4,4a,4b,5,6,7,9,10,10a - dodecahydrophenanthrene-1-carboxylic acid by treatment with 1-buten-3-one and alkali. In practice it is convenient to generate the 1-buten-3-one from a Mannich base such as dialkylamino-butanone. In this reaction there occurs the formation of several valuable by-products which are separated by chromatographic procedures as indicated hereinbelow. Typically, the reaction mixture is applied to a chromatography column containing silica gel which is developed with benzene solutions containing increasing concentrations of ethyl acetate. Initially there is eluted a mixture of the compounds described hereinabove with the more ether soluble lower alkyl esters of 3-oxo-6,8,11a-trimethyl - 2,3,7,7a,8,9,10,11,11a,11b - decahydro - 1 - benz[de]anthracene-8-carboxylic acid of the structural formula

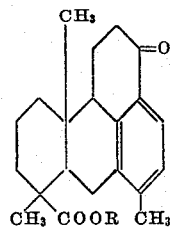

Elution of the column with higher concentrations of ethyl acetate in benzene yields as a further product the lower alkyl ester of 1,4a-dimethyl-7-oxo-8-(3'-oxobutyl)-1,2,-3,4,4a,4b,5,6,7,9,10,10a - dodecahydrophenanthrene - 1 - carboxylic acid.

The lower alkyl esters of 1,4a-dimethyl-8-oxo-1,2,3,-4,4a,4b,5,6,8,9,10,11,12,12a - tetradecahydrochrysene - 1-carboxylic acid are active hormonal agents and, specifically, they are androgens.

The compounds which constitute this invention and the methods for their preparation will appear more fully from the examples given below. However, the invention is not to be construed as limited thereby in spirit or in scope as it will be apparent to those skilled in the art that numerous modifications in materials and methods can be adopted without departing from the invention. In these examples, quantities are given in parts by weight and temperatures in degrees centigrade (° C.).

Example 1

To a solution of 4.6 parts of 1,4a-dimethyl-7-oxo-1,2,3,4,4a,4b,5,6,7,9,10,10a - dodecahydrophenanthrene-1-carboxylic acid methyl ester in 45 parts of ethanol are added 2.3 parts of 4 - diethylamino-2-butanone and 2.3 parts of iodomethane. Nitrogen is passed over the solution and 10 parts of a sodium methoxide solution containing 0.25 part of sodium are added. The mixture is permitted to stand for 2 hours at room temperature and is then refluxed for 3 hours and allowed to stand for 15 hours at room temperature. Then 1.6 parts of acetic acid are added to the reaction mixture and the solvents are removed by evaporation on a steam bath. The residue is extracted with ether and the ether extract is washed with water, 5% sodium bicarbonate solution and again with water. The ether solution is then dried over sodium sulfate, filtered, and evaporated. The residue is dissolved in a 3:1 mixture of benzene and petroleum ether and thus applied to a chromatography column containing silica gel. The column is developed with benzene and then with benzene solutions containing increasing concentrations of ethyl acetate in benzene. The solution containing 2% of ethyl acetate in benzene elutes a mixture of two compounds. The residue obtained by evaporation of this eluate is digested with ether and filtered. A solid melting at about 144–146° is obtained. The compound shows an absorption at 302 millimicrons with a molecular extinction coefficient of 4,800. Infrared absorption maxima are observed at 5.82, 5.92, 6.18, 6.34, 7.06, 8.02, 8.35, and 8.56 microns. This product is the methyl ester of 1,4a-dimethyl-8-oxo-1,2,-3,4,4a,4b,5,6,8,9,10,11,12,12a - tetradecahydrochrysene-1-carboxylic acid.

The ether washings are taken to dryness and brought to constant weight under reduced pressure. A glass is obtained which shows absorption at 262.5 and 300 millimicrons in the ultraviolet region with molecular extinction coefficients of 10,400 and 2,400 respectively. Infrared absorption is observed at 5.82, 5.96, 6.34, 7.20, 8.00, 8.65 and 8.98 microns. This compound is the methyl ester of 3-oxo-6,8,11a-trimethyl-2,3,7,7a,8,9,10,-11,11a,11b - decahydro - 1 - benz[de]anthracene - 8 - carboxylic acid.

Further workup of the chromatography column with a 5% solution of ethyl acetate in benzene and concentration of the eluate yields a glassy substance which shows absorption at 257 and 302 millimicrons with molecular extinction coefficients of 6050 and 3540 respectively. In the infrared absorption spectrum maxima are observed at 5.82, 6.02, 6.28, 7.23, 8.0–8.04, 8.64 and 8.96 microns. This compound is a methyl ester of 1,4a-dimethyl-7-oxo - 8 - (3' - oxobutyl) - 1,2,3,4,4a,4b,5,6,7,9,10,10a - dodecahydrophenanthrene-1-carboxylic acid.

Example 2

Substitution of the ethyl ester of 1,4a-dimethyl-7-oxo - 1,2,3,4,4a,4b,5,6,7,9,10,10a - dodecahydrophenan-threne-1-carboxylic acid in the procedure of the foregoing example also yields a comparable mixture of products. The workup is conducted as in the preceding example and elution of the column with a 2% solution of ethyl acetate in benzene yields a mixture of two products. The residue obtained by concentration of the eluate is digested with ether and the insoluble fraction is collected on a filter. There is thus obtained the ethyl ester of 1,4a-dimethyl - 8 - oxo - 1,2,3,4,4a,4b,5,6,7,9,10,11,12,12a - tetradecahydrochrysene-1-carboxylic acid, which shows an ultraviolet maximum at 302 millimicrons and a molecular extinction coefficient of about 5,000.

What is claimed is:

1. Lower alkyl ester of 1,4a-dimethyl-8-oxo-1,2,3,4,-4a,4b,5,6,8,9,10,11,12,12a - tetradecahydrochrysene - 1 - carboxylic acid.

2. Methyl ester of 1,4a-dimethyl-8-oxo-1,2,3,4,4a,4b,-5,6,8,9,10,11,12,12a - tetradecahydrochrysene - 1 - carboxylic acid.

No references cited.